US 10,006,714 B2

(12) United States Patent
Schmidt et al.

(10) Patent No.: US 10,006,714 B2
(45) Date of Patent: Jun. 26, 2018

(54) APPARATUS FOR DRYING A MATERIAL (71) Applicant: MARS, INCORPORATED, McLean, VA (US)

(72) Inventors: Siegfried Schmidt, Verden (DE); Maria Toivonen, Verden (DE)

(73) Assignee: Mars, Incorporated, McLean, VA (US)

( * ) Notice: Subject to any disclaimer, the term of this patent is extended or adjusted under 35 U.S.C. 154(b) by 0 days. days.

(21) Appl. No.: 15/232,952

(22) Filed: Aug. 10, 2016

(65) Prior Publication Data

US 2016/0348967 A1 Dec. 1, 2016

Related U.S. Application Data (60) Division of application No. 14/740,096, filed on Jun. 15, 2015, which is a continuation of application No. 12/671,669, filed as application No. PCT/EP2008/006428 on Aug. 5, 2008, now abandoned.

(30) Foreign Application Priority Data

Aug. 7, 2007 (DE) ........................ 10 2007 037 605

(51) Int. Cl.
F26B 25/00 (2006.01)
F26B 21/14 (2006.01)
F26B 15/14 (2006.01)
F26B 3/04 (2006.01)
F26B 15/18 (2006.01)
(Continued)

(52) U.S. Cl.
CPC .............. F26B 25/006 (2013.01); F26B 3/00 (2013.01); F26B 3/02 (2013.01); F26B 3/04 (2013.01); F26B 15/143 (2013.01); F26B 15/18 (2013.01); F26B 21/14 (2013.01); F26B 25/002 (2013.01)

(58) Field of Classification Search
CPC ...... F26B 25/006; F26B 25/002; F26B 21/14; F26B 15/143; F26B 3/04; F26B 15/18; F26B 3/00; F26B 3/02
See application file for complete search history.

(56) References Cited

U.S. PATENT DOCUMENTS 346,227 A 7/1886 Katharina et al.
1,405,821 A 2/1922 Ehrhart
(Continued)

FOREIGN PATENT DOCUMENTS

BE 884264 11/1980
CN 102488298 6/2012
(Continued)

OTHER PUBLICATIONS

Barber, et al., "Effect of Dietary Phosphate Restriction on Renal Secondary Hyperparathyroidism in the Cat", J Small Anim Prac, Feb. 1999, 40, 62-70.
(Continued)

Primary Examiner — Jessica Yuen
(74) Attorney, Agent, or Firm — Mars, Incorporated (57) ABSTRACT An apparatus for drying a material is provided. The apparatus comprises a housing, a superheated steam generator, inlet and outlet ports disposed relative to the housing and an extraction unit for extracting volatile substances from the atmosphere within the housing.

15 Claims, 3 Drawing Sheets (51) Int. Cl.
*F26B 3/02* (2006.01)
*F26B 3/00* (2006.01)

(56) References Cited

U.S. PATENT DOCUMENTS

| | | | |
|---|---|---|---|
| 1,538,245 A | 5/1925 | Hulbert | |
| 1,927,215 A | 9/1933 | Peebles | |
| 2,268,563 A | 1/1942 | Ball | |
| 2,285,508 A | 6/1942 | Goss | |
| 2,319,673 A | 5/1943 | French | |
| 2,350,096 A | 5/1944 | Chilton | |
| 2,514,027 A | 7/1950 | Clifcorn | |
| 2,524,560 A | 10/1950 | Cote | |
| 2,630,957 A | 3/1953 | Olav et al. | |
| 2,660,513 A | 11/1953 | Ball | |
| 2,685,520 A | 8/1954 | Martin | |
| 2,759,307 A | 8/1956 | Eolkin et al. | |
| 2,862,822 A | 12/1958 | Whitmore | |
| 2,915,862 A | 12/1959 | Stover et al. | |
| 2,923,985 A | 2/1960 | Platt | |
| 3,025,875 A | 3/1962 | Stover et al. | |
| 3,063,846 A | 11/1962 | Polin et al. | |
| 3,197,312 A | 7/1965 | Eolkin | |
| 3,230,582 A | 1/1966 | Paul et al. | |
| 3,271,821 A | 9/1966 | Street et al. | |
| 3,292,272 A | 12/1966 | Powischill | |
| 3,336,722 A | 8/1967 | Der Winden | |
| 3,348,599 A | 10/1967 | Lohstoeter et al. | |
| 3,462,277 A | 8/1969 | Reinhart et al. | |
| 3,468,102 A | 9/1969 | Farrar | |
| 3,486,295 A | 12/1969 | Rausing et al. | |
| 3,493,996 A | 2/1970 | Rohn | |
| 3,527,606 A | 9/1970 | Taylor et al. | |
| 3,606,997 A | 9/1971 | Guckel | |
| 3,619,975 A | 11/1971 | Soroka et al. | |
| 3,792,950 A | 2/1974 | Cuff | |
| 3,803,726 A | 4/1974 | Pikon et al. | |
| 3,875,318 A | 4/1975 | Elmer | |
| 3,972,153 A | 8/1976 | Kiellarson et al. | |
| 4,011,345 A | 3/1977 | Bartsch | |
| 4,021,927 A | 5/1977 | Idaszak | |
| 4,022,915 A | 5/1977 | Zukerman et al. | |
| 4,027,450 A | 6/1977 | Chiu et al. | |
| 4,081,942 A | 4/1978 | Johnson | |
| 4,099,900 A | 7/1978 | Bradbury et al. | |
| 4,104,958 A | 8/1978 | Egger et al. | |
| 4,151,241 A | 4/1979 | Bradbury et al. | |
| 4,156,707 A * | 5/1979 | Joshi | C11D 13/08 264/101 |
| 4,190,679 A | 2/1980 | Coffee et al. | |
| 4,276,319 A | 6/1981 | Nguyen et al. | |
| 4,330,562 A | 5/1982 | Nassar et al. | |
| 4,413,971 A | 11/1983 | Nettleton et al. | |
| 4,495,974 A | 1/1985 | Pohorski | |
| 4,533,515 A | 8/1985 | Witter et al. | |
| 4,539,214 A | 9/1985 | Winter et al. | |
| 4,543,263 A | 9/1985 | Goldhahn | |
| 4,635,380 A | 1/1987 | Anderson et al. | |
| 4,662,836 A * | 5/1987 | Kelchner, Jr. | D04H 13/00 264/435 |
| 4,752,491 A | 6/1988 | D'Alterio et al. | |
| 4,830,866 A | 5/1989 | Seiler et al. | |
| 4,885,897 A | 12/1989 | Gryouda et al. | |
| 4,942,717 A | 7/1990 | Kozub | |
| 4,943,437 A | 7/1990 | Kvanta et al. | |
| 5,059,433 A | 10/1991 | Lee et al. | |
| 5,101,717 A | 4/1992 | Manser et al. | |
| 5,153,017 A | 10/1992 | Schaaf et al. | |
| 5,171,600 A | 12/1992 | McKenzie et al. | |
| 5,194,122 A * | 3/1993 | Bleeker | C05F 3/00 203/34 |
| 5,415,765 A | 5/1995 | Stacy et al. | |
| 5,498,432 A | 3/1996 | Leu et al. | |
| 5,505,567 A | 4/1996 | Scott et al. | |
| 5,520,944 A | 5/1996 | Richardson et al. | |
| 5,706,588 A * | 1/1998 | Dausch | D06F 58/22 34/327 |
| 5,711,086 A | 1/1998 | Stubbing | |
| 5,723,082 A | 3/1998 | Mizuguchi et al. | |
| 5,802,961 A | 9/1998 | Hay et al. | |
| 5,830,260 A | 11/1998 | Yueksel et al. | |
| 5,915,815 A | 6/1999 | Moore et al. | |
| 5,918,805 A | 7/1999 | Guyer | |
| 5,948,336 A | 9/1999 | Yoshida et al. | |
| 5,968,569 A | 10/1999 | Cavadini et al. | |
| 6,098,307 A | 8/2000 | Pikus et al. | |
| 6,099,288 A | 8/2000 | Long | |
| 6,220,847 B1 | 4/2001 | Mizuguchi et al. | |
| 6,268,012 B1 | 7/2001 | Sikora | |
| 6,287,618 B1 | 9/2001 | Shinji et al. | |
| 6,401,524 B1 | 6/2002 | Incavo et al. | |
| 6,438,863 B1 | 8/2002 | Jensen | |
| 6,622,457 B2 | 9/2003 | Kurth | |
| 6,634,939 B2 | 10/2003 | Johnson et al. | |
| 6,787,073 B1 | 9/2004 | Tadler et al. | |
| 6,931,757 B2 | 8/2005 | Greubel et al. | |
| 6,935,855 B2 | 8/2005 | Flarup-Knudsen | |
| 7,024,800 B2 | 4/2006 | Gorbell et al. | |
| 7,037,543 B2 | 5/2006 | Sandusky et al. | |
| 7,128,546 B2 | 10/2006 | Chszaniecki et al. | |
| 7,377,052 B2 * | 5/2008 | Maruca | D06F 58/20 236/44 C |
| 7,444,795 B2 | 11/2008 | Yasuhira | |
| 7,479,294 B2 | 1/2009 | Sokhey et al. | |
| 7,631,476 B2 | 12/2009 | Yasuhira et al. | |
| 7,799,364 B2 | 9/2010 | Colliver et al. | |
| 7,838,057 B2 | 11/2010 | Schmidt et al. | |
| 8,327,606 B2 | 12/2012 | Kemp et al. | |
| 8,484,933 B2 | 7/2013 | Schmidt et al. | |
| 8,741,368 B2 | 6/2014 | Schmidt | |
| 8,827,671 B2 | 9/2014 | Schmidt | |
| 8,834,764 B2 | 9/2014 | Schmidt et al. | |
| 9,119,407 B2 | 9/2015 | Ortiz | |
| 2003/0070317 A1 | 4/2003 | Anderson et al. | |
| 2004/0220435 A1 | 11/2004 | Stubbing | |
| 2005/0155249 A1 | 7/2005 | Christensen | |
| 2006/0088633 A1 | 4/2006 | Barber et al. | |
| 2006/0233922 A1 | 10/2006 | Kegler et al. | |
| 2007/0284771 A1 | 12/2007 | Boothe et al. | |
| 2010/0086659 A1 | 4/2010 | Schmidt | |
| 2010/0112177 A1 | 5/2010 | Bourg et al. | |
| 2010/0233756 A1 | 9/2010 | Sunvold et al. | |
| 2011/0030237 A1 | 2/2011 | Schmidt et al. | |
| 2013/0122164 A1 | 5/2013 | Montelongo et al. | |
| 2015/0367972 A1 | 12/2015 | Schmidt | |
| 2016/0355290 A1 | 12/2016 | Schmidt | |

FOREIGN PATENT DOCUMENTS

| | | |
|---|---|---|
| DE | 806111 | 6/1951 |
| DE | 3818422 A1 | 12/1989 |
| DE | 19528985 A1 | 2/1997 |
| DE | 19528986 A1 | 2/1997 |
| DE | 2545440 | 4/1997 |
| DE | 19847664 A1 | 4/2000 |
| DE | 69605360 | 7/2000 |
| DE | 102007037606 | 2/2009 |
| EP | 0094448 | 11/1983 |
| EP | 0208013 B1 | 6/1989 |
| EP | 0372444 | 6/1990 |
| EP | 0710670 | 5/1996 |
| EP | 0899195 | 3/1999 |
| EP | 0749897 | 12/1999 |
| EP | 1020362 | 7/2000 |
| EP | 1719416 A2 | 11/2006 |
| EP | 2008784 A1 | 12/2008 |
| GB | 223298 | 10/1924 |
| GB | 527011 | 10/1940 |
| GB | 587690 A | 5/1947 |
| GB | 655851 | 8/1951 |
| GB | 669319 | 4/1952 |
| GB | 832595 | 4/1960 |
| GB | 1456433 | 11/1976 |
| GB | 1523700 A | 9/1978 |

(56) References Cited

FOREIGN PATENT DOCUMENTS

| | | |
|---|---|---|
| GB | 2177923 | 12/1988 |
| JP | 50102446 A | 8/1975 |
| JP | 53005072 | 1/1978 |
| JP | 59-098660 | 6/1984 |
| JP | S59192053 A | 10/1984 |
| JP | 60501638 | 10/1985 |
| JP | 03210168 | 9/1991 |
| JP | 2000228970 A | 8/2000 |
| JP | 2002320663 A | 11/2002 |
| JP | 2004236611 A | 8/2004 |
| JP | 2006262706 A | 10/2006 |
| JP | 2007289649 A | 11/2007 |
| JP | 2008061591 A | 3/2008 |
| JP | 2008073021 A | 4/2008 |
| NL | 8001007 A | 9/1981 |
| SU | 892160 | 12/1981 |
| UA | 10712 | 12/1996 |
| WO | 8905949 A1 | 6/1989 |
| WO | 9304930 | 3/1993 |
| WO | 9428993 | 12/1994 |
| WO | 9504579 | 2/1995 |
| WO | 0205652 | 1/2002 |
| WO | 0240386 A1 | 5/2002 |
| WO | 2012016807 | 2/2012 |

OTHER PUBLICATIONS

Bissot, et al., "Novel Dietary Strategies can Improve the Outcome of Weight Loss Programmes in Obese Client-Owned Cats", J Feline Med Surg, Feb. 2010, 12, 104-12, Abstract only—2 pgs.

Boyd, et al., "Survival in Cats with Naturally Occurring Chronic Kidney Disease", J Vet Intern Med, Aug. 2008, 22, 1111-7.

Bronson, et al., "Variation in Age at Death of Dogs of Different Sexes and Breeds", Am J Vet Res, Nov. 1982, 43, 2057-9, Abstract Only—1 pg.

Brown, et al., "Characterization of the Renal Response to Protein Ingestion in Dogs with Experimentally Induced Renal Failure", Am J Vet Res, Apr. 1992, 53, 569-73.

Elliott, et al., "Survival of cats with Naturally Occurring Chronic Renal Failure: Effect of Dietary Management", J Small Anim Pract, Jun. 2000, 41, 235-42.

Feng, "Cooking Technology", China Light Industry Press, Mar. 31, 2006, pp. 96-97.

Finch, et al., "Parathyroid Hormone Concentration in Geriatric Cats with Various Degrees of Renal Function", J Am Vet Med Assoc, 241, No. 10 1326-35, Nov. 15, 2012.

Finco, et al., "Effects of Dietary Phosphorus and Protein in Dogs with Chronic Renal Failure", Am J Vet Res, Dec. 1992, 53, 2264-71, Abstract Only—2 pgs.

Fiora, et al., "A retrospective study on the prevalence and causative allergens of food-induced atopic dermatitis in France", Short Communication at ESVD Congress, Sep. 2013, Valencia, 1 pg; Veterinary Dermatology, 24, 377-397, Abstract Only—1 pg.

German, et al., "A High Protein High Fiber Diet Improves Weight Loss in Obese Dogs", Vet J, Mar. 2010, 183, 294-7.

German, et al., "Changes in Body Composition during Weight Loss in Obese Client-Owned Cats: Loss of Lean Tissue Mass Correlates with Overall Percentage of Weight Lost", J Feline Med Surg, Oct. 1, 2008, 10, 452-9, Abstract Only—6 pgs.

German, et al., "Use of Starting Condition Score to Estimate Changes in Body Weight and Composition during Weight Loss in Obese Dogs", Res Vet Sci, Feb. 2009, 87, 249-54.

Hefle, et al., "The Chemistry and Biology of Food Allergens", Food Technology, Mar. 1996, 50, 86-92.

Hess, et al., "Evaluation of Risk Factors for Fatal Acute Pancreatitis in Dogs", J. Am Vet Med Assoc, Jan. 1999, 214, 46-51, Abstract Only—2 pgs.

Hoenig, et al., "Insulin sensitivity, fat distribution, and adipocytokine response to different diets in lean and obese cats before and after weight loss", Am. J. Physiol. Regul. Integr. Comp. Physiol., 292, R227-R234 (Jan. 2007).

Impellizeri, et al., "Effect of Weight Reduction on Clinical Signs of Lameness in Dogs with Hip Osteoarthritis", J Am Vet Med Assoc, Apr. 2000, 216, 1089-91.

Jeusette, et al., "Influence of Obesity on Plasma Lipid and Lipoprotein Concentrations in Dogs", Am. J. Vet. Res, Jan. 2005, 66, 81-6.

Kealy, et al., "Evaluation of the Effect of Limited Food Consumption on Radiographic Evidence of Osteoarthritis in Dogs", J Am Vet Med Assoc, Dec. 2000, 217, 1678-80, Abstract Only—2 pgs.

Kealy, et al., "Five-Year Longitudinal Study on Limited Food Consumption and Development of Osteoarthritis in Coxofemoral Joints of Dogs", J Am Vet Med Assoc, Jan. 1997, 210, 222-5.

King, et al., "Prognostic Factors in Cats with Chronic Kidney Disease", J Vet Intern Med, May 2007, 21, 906-16.

Lem, et al., "Associations between Dietary Factors and Pancreatitis in Dogs", J Am Vet Med Assoc, Nov. 2008, 233, 1425-31.

Lund, et al., "Health Status and Population Characteristics of Dogs and Cats Examined at Private Veterinary Practices in the United States", J Am Vet Med Assoc, May 1999, 214, 1336-41, Abstract Only—2 pgs.

Marshall, et al., "The Effect of Weight Loss on Lameness on Obese Dogs with Osteoarthritis", Vet Res Commun, Mar. 2010, 34, 241-53.

Rokey, et al., "Feed Extrusion Process Description", R. Bras. Zootec., V. 39, Jul. 2010, 510-518.

Ross, et al., "Effect of Dietary Phosphorus Restriction on the Kidneys of Cats with Reduced Renal Mass", Am J Vet Res, Jun. 1982, 43, 1023-6, Abstract Only—1 pg.

Roudebush, "Ingredients and Foods Associated with Adverse Reactions in Dogs and Cats", Vet Dermatol, Apr. 2013, Letter to the Editor, 293-294.

Simpson, et al., "Long Term Management of Canine Exocrine Pancreatic Insufficiency", J Small Anim Pract, Mar. 1994, 35, 133-138.

Verlinden, et al., "Food Allergy in Dogs and Cats", Crit Rev Food Sci Nutr, Dec. 2006, 46, 259-73.

Villaverde, et al., "Nutritional Management of Exocrine Pancreatic Diseases", Applied Veterinary Clinical Nutrition, Fascetti, A.J. and Delaney, S.J. (eds), Jan. 2012, 24 pgs.

Westermarck, et al., "Exocrine Pancreatic Insufficiency in Dogs", Vet Clin North Am Small Anim Pract, Sep. 2003, 33, 1165-79, viii-ix, Abstract Only—2 pgs.

Xenoulis, et al., "Effect of a Low-Fat Diet on Serum Lipoprotein Profiles in Miniature Schnauzers with Primary Hyperlipidemia", ACVIM Forum Abstract, Jun. 2013, 2 pgs.

Xenoulis, et al., "Serum Triglyceride Concentrations in Miniature Schnauzers with and without a History of Probable Pancreatis", Journal of Veterinary Internal Medicine, Jan. 2011; 25:20-25.

Yamka, et al., "Effects of 3 Canine Weight Loss Foods on Body Composition and Obesity Markers", Intern J Appl Res Vet Med, Sep. 2007, 5, 125-132.

Greene, "Food Program Memorandum", Policy Compliance Guidelines for Reduced Oxygen Packaging at Retail, Apr. 26, 2011, 7 Pages.

Morgan, et al., "Low Oxygen Recycled Vapor (LORV) for Food Drying", Journal of Food Science, vol. 44, Sep. 1979, pp. 1556-1557.

Van Deventer, et al., "Drying with Superheated Steam", Drying Technology, 19(8):2033-2045 (2001) Published Online Feb. 6, 2007.

* cited by examiner

Fig. 2

APPARATUS FOR DRYING A MATERIAL

CROSS-REFERENCE TO RELATED APPLICATIONS

This application is a divisional of U.S. application Ser. No. 14/740,096, filed on Jun. 15, 2015 (pending), which is a continuation of U.S. application Ser. No. 12/671,669, filed on Mar. 17, 2010, now abandoned, which in turn is a national phase application under 35 USC §371 of PCT Application No. PCT/EP2008/006428 filed on Aug. 5, 2008, claiming the benefit of foreign priority to German Application No. DE 10 2007 037 605.9 filed on Aug. 7, 2007, all of which are incorporated herein by reference.

FIELD

The invention relates to a method and an apparatus for drying a material.

BACKGROUND

Numerous materials first have to be dried before further processing or packing. Furthermore, especially if the material is a food product, the drying process must as far as possible be performed in such a way that any contact between the material to be dried and germs or other microorganisms can be ruled out. With conventional drying methods, in which there is contact between the material and dry air, it is, however, difficult to achieve general sterility. Furthermore, the drying inevitably involves a certain loss of volatile components, which escape from the material because of the elevated drying temperature.

The problem of the invention consists in providing a method and an apparatus which make it possible to dry a material efficiently without this entailing any contamination with undesirable germs and without any excessive loss of volatile components occurring.

SUMMARY

From the apparatus point of view, the problem of the invention is solved by an apparatus for drying an extruded material, comprising a housing for holding a gaseous atmosphere with superheated steam, the housing having an inlet port and an outlet port, a means for generating a gaseous atmosphere with superheated steam inside the housing, a first transport means for transporting material through the inlet port into the housing, a second transport means for transporting the material through the outlet port out of the housing, and an extraction unit for extracting volatile substances from the gaseous atmosphere.

It is appropriate for the inlet port to be disposed at a free end of an inlet duct.

The outlet port can be disposed at a free end of an outlet duct.

The inlet and/or the outlet duct can extend downwards from the housing.

It can be provided that a ventilation line communicates with the housing and has an exit aperture at a height below the housing and above the inlet and outlet ports and leading to the outside.

Alternatively, or in addition, it is possible for an extraction line to communicate with the housing and to be conducted via a fan to a condenser.

The first and/or second transport means may have a perforated conveyor belt.

A conduit subjected to elevated or reduced pressure can be disposed along a part-section of the first transport means, communicating with the housing, especially with the lower portion thereof.

A flow guide or sealing means may be disposed between the conduit and the partial section of the first transport means in order to ensure that there is an intensive flow round or through the transport means through the gaseous atmosphere.

It is also contemplated that there may be a packing station associated with the apparatus for packing the dried material.

It is convenient for the second transport means to extend as far as the packing station.

It is preferably provided that the extraction unit takes the form of a spinning cone column for extracting volatile substances from condensate from the gaseous atmosphere.

BRIEF DESCRIPTION OF THE DRAWINGS

Further advantages and features of the invention will become clear from the following description of a preferred embodiment, reference being made to a drawing in which.

DETAILED DESCRIPTION OF THE INVENTION

Figure 1:
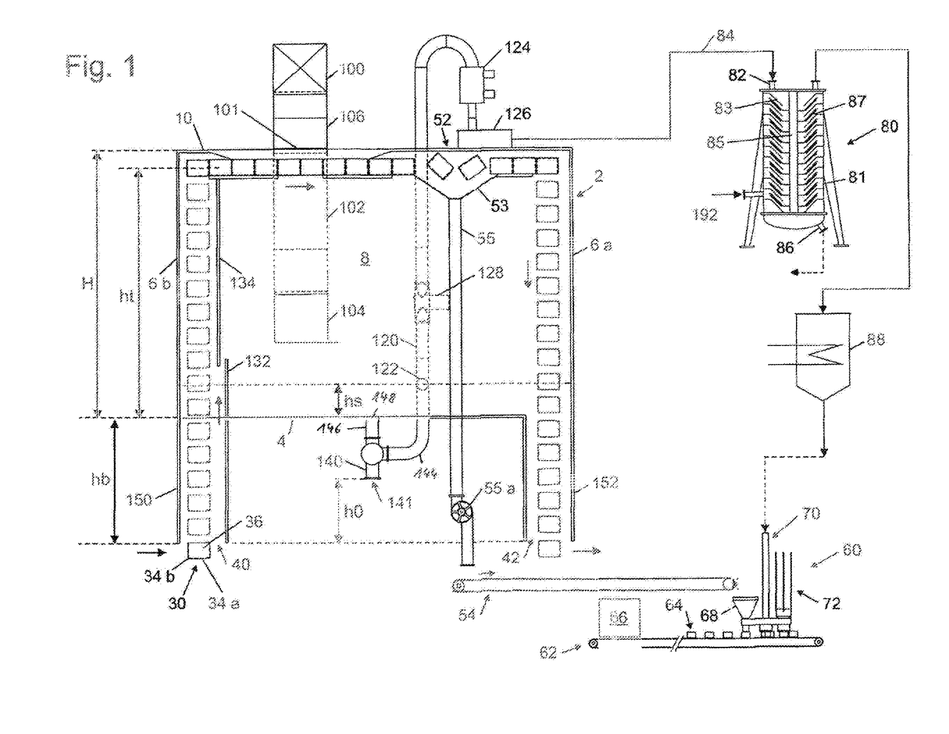
FIG. 1 shows a schematic side view of an apparatus in accordance with the invention, with which the method of the invention can be carried out.

The apparatus consists first of a housing 2 with a bottom wall 4, a right-hand side wall 6a, a left-hand side wall 6b, a rear wall 8, a corresponding front wall, not shown, and an upper wall 10. The bottom wall 4 is arranged substantially horizontally.

The front wall, not shown, is substantially parallel to the rear wall 8 and abuts the lateral edges of the upper wall, the side walls and the bottom wall in such a manner as to create a seal, so that, apart from the apertures, which will be explained below, the housing 2 surrounds an interior space which is enclosed on all sides.

A transport means 30, which in this example forms the first and second transport means, is formed by an endless supporting means (chain, cable, pair of chains or the like), not shown, with bowls or trays 34 held on it. The transport means 30 extends through an inlet port 40 into or beneath the bottom wall 4 upwards in the direction of the upper wall 10, runs horizontally along the upper wall, spaced apart from the latter vertically, and then back down in the direction of the bottom wall 4 and through an outlet port 42 out of the housing. Each tray 34 has a bottom wall 34a and a trough-like peripheral side wall 34b and is intended to receive a particular quantity of the material to be dried. The trays 34 are preferably gas-permeable, in order to permit the gaseous atmosphere present in the housing 2 to pass through to the material unhindered, and may, for example, have a perforated bottom and/or side wall or consist entirely or partially of a porous material, rib mesh or the like, the size of the openings provided in the walls or the porosity depending on the material to be dried.

Instead of the trays, a conveyor belt can be provided as the transport means, on which the material to be dried is located, e.g. a flat conveyor belt or one which is concave like a trough, possibly perforated or porous.

The trays 34 are each conveniently hung on the carrier on a horizontal pivoting axis 36 running higher than their center of gravity, allowing them to swing freely in pendulum fashion, so that they maintain their orientation with their bottom walls facing downwards despite the changes in direction of the supporting means.

The course followed by the transport means 30 before it enters the inlet port 40 and after it leaves the outlet port 42 is dependent on the specific circumstances of the particular application. Outside the housing and before the transport means enters the inlet port, a filling means may be provided, for example, where the trays 34 are filled with the material. The transport means 30 is preferably guided in an endless loop, constantly circulating between the filling means, inlet and outlet port, though as an alternative, it can also be designed for batch operation, moving to and fro, either endlessly or as a section of specific length, with a separate beginning and end.

In the embodiment illustrated, a discharge means 52 is provided, at which the dried material is emptied from each individual tray 34 via collector trays 53 and a chute 55, if necessary with a lock 55a to cut off the pressure, onto a conveyor 54, which transports the material to a packing station 60. It can, for example, be provided that trays 34 are swiveled by 180°. about their pivoting axis 36 at the discharge means 52, so that the material contained in them falls onto the collector trays 53.

A packing conveyor 62 transports packing containers 64 such as screw-topped jars, tins, pouch packs or the like from a charging apparatus 66, where the packing containers are delivered to the packing conveyor, first to a filling station 68 of the packing station, where the dried material is filled into a respective packing container.

At an adding station 70, extracted volatile substances, such as flavors, can be added to the packing container. The substances can be added either in the form in which they have been extracted, i.e. in pure form or dissolved in a solvent such as water. Alternatively, there is the possibility of first mixing the extracted substances, before they are added to the packing container, with a carrier material, which will preferably be a material that is additionally added to the dried material in the packing container anyway, such as a coated layer, coating, filling, cream, gravy or the like. The extracted substances may, for example, be added proportionately, i.e. in the same amount as they were released from the amount of material contained in a packing container during the previous drying process. In this way, the original content of volatile substances in the material is restored to a very great extent. Alternatively, it is possible to add a larger or smaller dose of volatile substances or to put them to some other use.

At a sealing station 72, the individual filled packing containers are sealed, i.e. with a screw-on lid or can lid, for example, or, in the case of a pouch pack by sealing.

An extraction unit 80 for recovering volatile substances, such as flavors, preferably takes the form of a spinning cone column or spinning table column. This is a vertical cylinder 81, in which an inert separating gas such as steam at normal or reduced pressure separates a vaporous stream of volatile components from a fluid input or a slurry. From top to bottom, there is an alternating arrangement of fixed conical sheets of metal 83 attached to the interior wall of the cylinder, and conical sheets of metal 87 attached to a rotating shaft 85.

The fluid input to be extracted, in this case the condensate forming in the housing 2, is introduced into a product input 82 at the top of the column via an extraction line 84. Under the force of gravity, the liquid flows downwards and inwards on the upper surface of the first fixed cone 83 and, on the inside, reaches the first rotating cone 87, on which the liquid is distributed into a thin, turbulent film because of the centrifugal forces acting on it, and then flows upwards and outwards and passes from the outer edge of the rotating cone onto the next-lower stationary cone 83 until, having passed through all the cones, it reaches an outlet 86 at the foot of the column, where there is only a small content of volatile substances left in it.

The inert separating gas, steam 192 in this case, which is fed in counterflow, flows through the column from bottom to top and absorbs volatile components from the condensate. When the steam enriched with volatile substances reaches the head of the column, it is condensed in a condenser 88, so that the volatile substances are available in a concentrated form, dissolved in water, and can be delivered in the manner described to the dried material and/or a packing container or used in some other way.

In order to generate the desired gaseous atmosphere with superheated steam or an atmosphere of pure superheated steam with little or no air content at all inside the housing 2, such as is described in U.S. Pat. No. 5,711,086, there is a heating means 100 inside a conduit 102, which leads, on the one hand, into the upper wall 10 in an opening 101 located above the transport means 30 and, on the other hand, into an opening 104 in the rear wall 8 at a certain height above the bottom wall 4. A flow generator, in this case fan 106, provides for a current, such that it extracts via the opening 101 and blows out into the opening 104.

Attached to the upper wall 8 beneath the opening 101 are baffle plates 130, directed towards one other, as flow guide or sealing means which ensure that the greatest possible portion of the steam atmosphere extracted from the housing 2 through the opening 101 flows through the perforated tray or trays 34, which are located just beneath the opening 101. This ensures that the product located in the trays comes into intimate contact with the superheated steam.

Two further baffle plates 132, 134 are arranged substantially parallel to the left-hand side wall 6b and overlapping with a slight space between them. The task of these baffle plates is, as far as possible, to prevent excessive amounts of ambient air being introduced into the housing 2 by the moving transport means 30. A gap between the baffle plates in the vicinity of the bottom wall 4 allows air or an air-rich steam atmosphere of relatively high density to escape from the housing to the outside.

Alternatively, or in addition, a nozzle-like flow guide for the steam can be provided by means of a constriction, in order to cause a local increase in the flow speed and thus to achieve an intensified application and improved contact of the steam with the material to be dried.

In a lower region of the housing, preferably in the region of a deepest point of the housing directly above the bottom wall 4, an extraction line 120 leads into an extraction port 122 in the rear wall 8 and to a condenser 124, from which condensate is conducted into a container 126. Inside the extraction line 50, there is a controlled fan 128, which is controlled by a control unit on the basis of temperature and moisture or steam content information. For this purpose, at least one temperature sensor and at least one steam content sensor are disposed inside the housing to determine the condition of the steam (relative humidity and/or degree of saturation, or steam content), preferably each in the vicinity of the upper and lower walls and/or in the vicinity of the extraction port 122. If there is any superheated steam present, it is possible in this way to determine the degree of superheating or the temperature difference relative to the saturation state. By means of an enhanced extraction of relatively moist steam, while at the same time supplying heat, the composition of the gaseous atmosphere inside the housing can be shifted in the direction of a higher content of superheated steam at a higher temperature. The extraction port can be disposed on the same level as the bottom wall, in it or above it.

The gas/steam atmosphere conducted in a closed circuit via the conduit 102 and the housing 2 can be heated to a desired temperature in this way. The material entering the housing 2 causes an input of water or steam in the housing, so that, if sufficient energy or heat is delivered into the housing, the steam content inside the housing increases. By means of an appropriate open or closed-loop control of the steam extracted via the extraction line 120 and condensed in the condenser 124, the steam content in the housing 2 can be adjusted. If there is no extraction, surplus steam is released to the outside through the inlet and/or outlet port 40, 42.

FIG. 1 shows an additional possibility of removing steam from the housing, the saturated steam and thus the surplus humidity being removed from the housing, instead of by extraction via the extraction port 122, alternatively via a ventilation line 140, or both. The ventilation line 140 is connected to three-way valve 142, which is also connected, via a connection line 144 to the extraction line 120 and to a further connection line 146 with an opening 148 in the bottom wall 4. The ventilation line 140 has a ventilation aperture 141 leading to the outside.

The three-way valve 142 can be placed in a first position, in which the lines 144 and 146 are connected to one another, while the ventilation line 140 is closed off, so that extraction is effected via the openings 122 and 148. If so desired, a check valve can be provided in the line 144 in order to ensure that, in the first position of the three-way valve, extraction occurs exclusively via the opening 122.

The three-way valve 142 can be placed in a second position, in which the vent line 140 communicates with the conduit 146, while the conduit 144 is sealed off and the fan 128 is switched off, so that the steam atmosphere within the housing communicates with the environment via the port 148 and the conduits 146 and 140.

The apparatus illustrated in FIG. 1 includes guide ducts, or inlet and outlet ducts 150, 152, which, in the region of the openings in the bottom wall, namely the inlet port 40 and the outlet port 42, extend the housing downwards and terminate openly at substantially the same height. These guide ducts enclose the transport means 30 at the inlet and outlet sides and, together with the ventilation line 140, which terminates on a higher level, ensure that surplus steam is released from the interior of the housing 2 via the ventilation line 140, in the second position of the three-way valve 142. The steam located inside the housing has a tendency to flow downwards through the guide ducts, but encounters relatively cold ambient air in the process, so that a substantially horizontal boundary layer forms in all the guide ducts at the level of the ventilation aperture 141. The height h0 at which the vent aperture 141 is located above the height of the free end of the guide channels may, for example, 10%, 20%, 30% or 50% of the height H of the housing, H referring to the vertical distance between the highest and lowest point of the interior of the housing. In addition, the height h0 is preferably between about 30% and 70%, e.g. 50%, of the vertical extent hb of the guide ducts, beginning at the lower wall 4 or the lowest point of the housing.

In all embodiments, a height hs of the extraction port 122 above the lower wall 4 of the housing or the lowest point of the housing may be virtually zero in effect, or it may be about 5%, 10%, 15%, 20% or 30% of H. A height ht at which the actual drying process mainly takes place and at which or above which the horizontal sub-layer is preferably located, in which the gaseous atmosphere is of the desired high temperature and exhibits low oxygen values, may be about 50%, 60%, 70%, 80%, 90% or 95% of the height H of the housing, measured in each case from the lower wall of the housing 4 or the lowest point of the housing.

In order to accelerate or intensify the generation of the desired gaseous atmosphere, a steam feed line, not shown, can be used to introduce superheated steam directly into the housing 2. Alternatively, it can be provided that a steam or water feed line, such as a water atomizer, leads into the conduit 102 upstream of the heating means 100, so that by heating the steam or evaporating the water, a superheated steam atmosphere can be introduced in the region of the opening 104.

Figure 3:
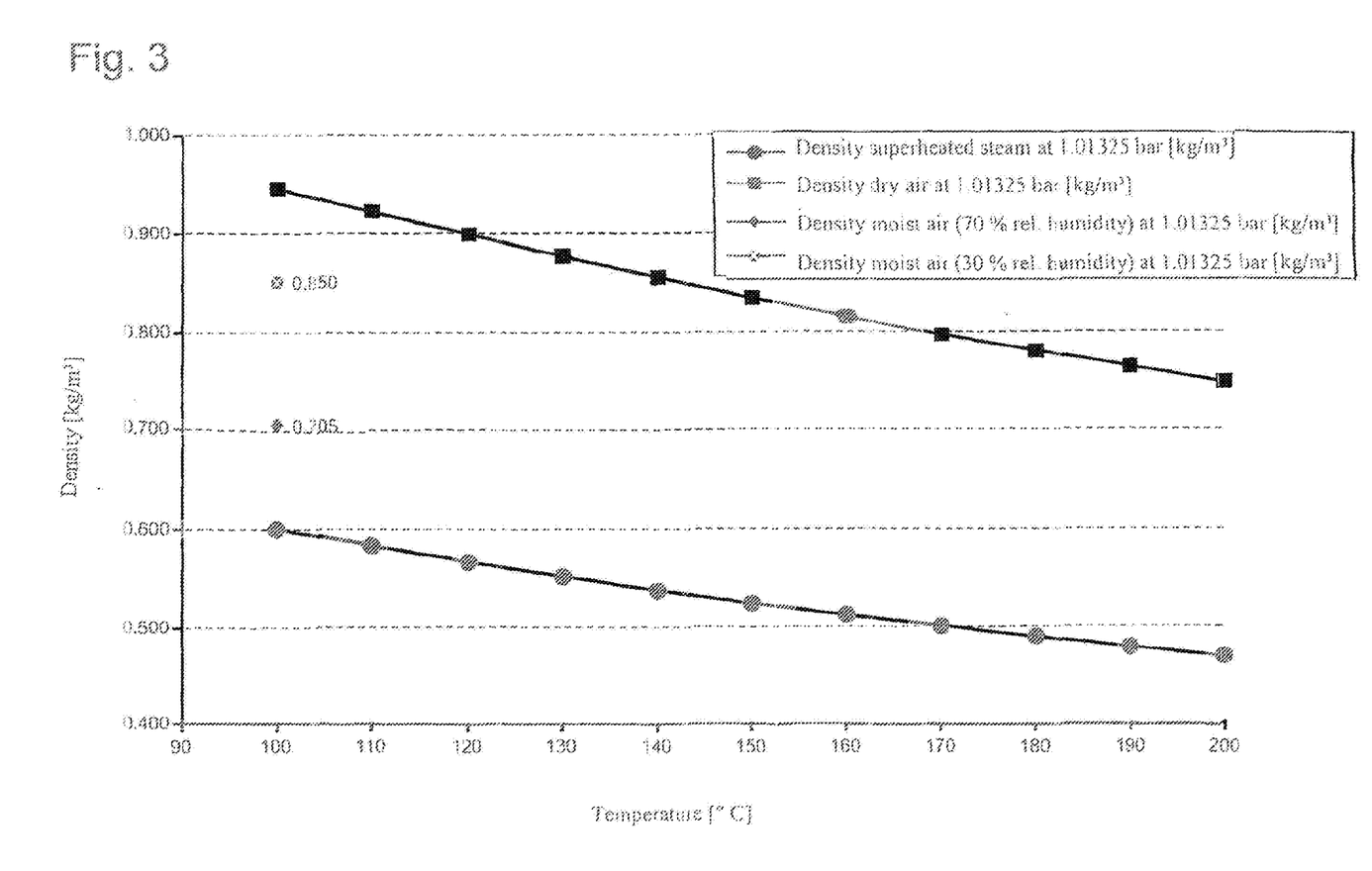
FIG. 3 shows density values of steam and air at different temperatures.

Because of the different densities of steam at different temperatures and because of the influence of any air that might be mixed in, as is shown in FIG. 3, it is possible and intended for vertical layers to form inside the housing, with superheated steam collecting at the top and moister steam and/or a steam-air mixture collecting at the bottom. For this reason, the transport means 30 runs partially in an upper region of the housing at height ht in the vicinity of the upper wall 10, i.e. inside a zone of superheated steam, after which the material is then conveyed towards the outlet port 42 located on a lower level. The low position of the outlet port 42 makes it difficult for superheated steam to escape directly from the housing, which would be an undesirable loss.

Figure 2:
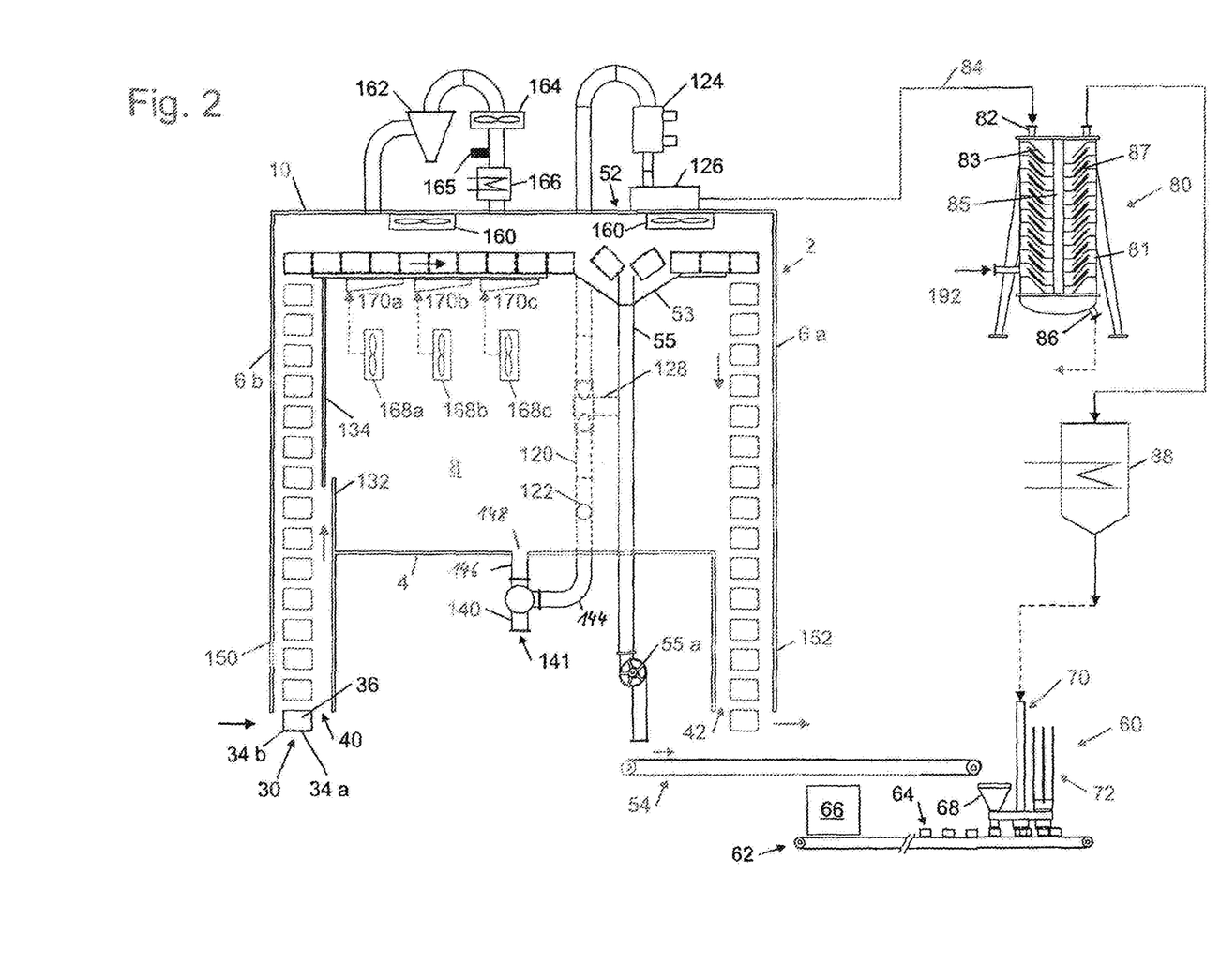
FIG. 2 shows a variant of the apparatus according to FIG. 1.

FIG. 2 illustrates a variant of the invention in which—unlike the embodiment illustrated in FIG. 1—the aim is not to have a distinct horizontal succession of layers, namely a steam atmosphere that, moving from bottom to top, becomes increasingly hotter, poorer in air and oxygen and increasingly contains only superheated steam, but rather a steam atmosphere which is mixed as thoroughly as possible and homogenized within the entire housing. This is achieved in that the interior of the housing is evenly mixed with the aid of at least one circulation fan 160 (FIG. 2 shows two of them), so that virtually no stratification or uneven mixing can become established in the vertical direction.

In addition, the contact between the material to be dried and the steam atmosphere is improved with a forced circulation system consisting of a cyclone 162, a fan 164, a heat exchanger 166, fans 168a, b, c and, connected to them, steam guide boxes 170a, b, c. Depending on what is more appropriate, the cyclone 162, fan 164, heat exchanger 166 and fans 168a, b, c may be disposed inside or outside the housing 2. Depending on the flow conditions, either the fan 164 or the fans 168a, b, c may be dispensed with. The fan 164 sucks in the steam atmosphere across the cyclone 162 upstream, in which particles originating from the material to be dried are deposited. The cyclone for its part sucks in the steam atmosphere at any suitable point or area within the housing. Downstream of the fan 164, the steam atmosphere flows through the heat exchanger 166, having optionally been enriched with steam beforehand by means of a steam generator 165. In the heat exchanger 166, heat may be supplied or removed as required, whereupon the steam atmosphere then enters the steam guide boxes 170a, b, c via the fans 168a, b, c. The steam guide boxes guide the steam atmosphere through a preferably perforated conveyor belt of the transport means 30, so that the material on it is brought into intimate contact with the steam atmosphere.

LIST OF REFERENCE NUMERALS

2 Housing
4 Bottom wall
6a, b Right-hand, left-hand side wall
8 Rear wall
10 Upper wall
30 Transport means
34 Tray
34a Bottom wall
34b Side wall
36 Pivoting axis
40 Inlet port
42 Outlet port
52 Discharge means
53 Collector tray
54 Conveyor
55 Chute
55a Lock
60 Packing station
62 Packing conveyor
64 Packing container
66 Charging apparatus
68 Filling station
70 Adding station
72 Sealing station
80 Extraction unit
81 Cylinder
82 Product input
83 Fixed cone
84 Extraction line
85 Rotating shaft
86 Outlet
87 Rotating cone
88 Condenser
100 Heating means
101 Opening (in 10)
102 Conduit
104 Opening (in 8)
106 Fan
120 Extraction line
122 Extraction port
124 Condenser
126 Container
128 Fan
130 Baffle plate
132, 134 Baffle plate
140 Ventilation line
141 Ventilation aperture
142 Three-way valve
144, 146 Connection line
148 Opening
150 Inlet duct
152 Outlet duct
160 Circulation fan
162 Centrifugal cyclone separator
164 Fan
165 Steam generator
166 Heat exchanger
168a, b, c Fan
170a, b, c Steam guide box

What is claimed is:

1. An apparatus for drying an extruded food product, comprising:
    a housing for holding a gaseous atmosphere with superheated steam that includes an inlet port and an outlet port;
    a means for generating a gaseous atmosphere with superheated steam inside the housing;
    a first transport means for transporting the extruded food product through the inlet port into the housing;
    a second transport means for transporting the extruded food product through the outlet port out of the housing;
    an extraction unit for extracting volatile substances from a condensate of the gaseous atmosphere;
    an adding station for adding the extracted volatile substances to a packing container; and
    a packing station for packing the extruded food product that is transported through the outlet port out of the housing into the packing container.

2. The apparatus as claimed in claim 1, wherein the inlet port is disposed at a free end of an inlet duct.

3. The apparatus of claim 2, wherein the inlet duct extends downwards from the housing.

4. The apparatus of claim 1, wherein the outlet port is disposed at a free end of an outlet duct.

5. The apparatus of claim 1, wherein a ventilation line communicates with the housing and has an exit aperture at a height below the housing and above the inlet port and the outlet port.

6. The apparatus of claim 1, wherein an extraction line communicates between the housing and a condenser.

7. The apparatus of claim 1, wherein the first transport means, the second transport means, or both are comprised of a perforated conveyor belt.

8. The apparatus of claim 1, where a conduit is disposed along a partial section of the first transport means and communicates with the housing.

9. The apparatus of claim 8, wherein a flow guide or sealing means is disposed between the conduit and the partial section of the first transport means.

10. The apparatus of claim 1, wherein the second transport means extends as far as the packing station.

11. The apparatus of claim 1, wherein the extraction unit includes a spinning cone column for extracting volatile substances from the condensate from the gaseous atmosphere.

12. The apparatus of claim 1, wherein a circulation fan is disposed in the housing.

13. The apparatus of claim 1, wherein the first transport means and the second transport means define a continuous transport means.

14. An apparatus for drying an extruded food product, comprising:
    a housing for holding a gaseous atmosphere with superheated steam that includes an inlet port and an outlet port;
    one or more generators for generating a gaseous atmosphere with superheated steam inside the housing;
    a first moving support for transporting the extruded food product through the inlet port into the housing;
    a second moving support for transporting the extruded food product through the outlet port out of the housing;
    an extraction unit for extracting volatile substances from a condensate of the gaseous atmosphere;
    an adding station for adding the extracted volatile substances to a packing container; and
    a packing station for packing the extruded food product that is transported through the outlet port out of the housing into the packing container.

15. The apparatus of claim 14, wherein the first moving support and the second moving support define a continuous moving support.

\* \* \* \* \*